United States Patent
Lesperance et al.

(10) Patent No.: US 9,821,424 B2
(45) Date of Patent: Nov. 21, 2017

(54) MANUFACTURING FIXTURE

(71) Applicant: GM Global Technology Operations LLC, Detroit, MI (US)

(72) Inventors: Ronald M. Lesperance, Troy, MI (US); Charles W. Wampler, II, Birmingham, MI (US); Mark Allen Smith, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 14/506,528

(22) Filed: Oct. 3, 2014

(65) Prior Publication Data

US 2016/0096246 A1    Apr. 7, 2016

(51) Int. Cl.
*B23Q 3/18* (2006.01)
*B23K 37/04* (2006.01)
(Continued)

(52) U.S. Cl.
CPC ............... *B23Q 3/18* (2013.01); *B23K 31/02* (2013.01); *B23K 37/0408* (2013.01);
(Continued)

(58) Field of Classification Search
CPC . B23Q 3/02; B23Q 3/06; B23Q 3/069; B23Q 3/18; B23Q 3/183; B23Q 3/186; B23Q 7/04; B23Q 7/047
(Continued)

(56) References Cited

U.S. PATENT DOCUMENTS

| 2,122,007 | A |   | 6/1938 | Kearney |
|---|---|---|---|---|
| 2,355,643 | A | * | 8/1944 | Grover ................... B65B 35/56 269/287 |

(Continued)

FOREIGN PATENT DOCUMENTS

| CN | 1170654 A | 1/1998 |
|---|---|---|
| CN | 101189093 A | 5/2008 |

(Continued)

OTHER PUBLICATIONS

Cone Locator Pins, Carr Lane Manufacturing Co., 1 page, http://www.carrlane.com/catalog/index.cfm/27225071F0B221118070C1C512A0A1F0900101B030010543C1C0C16190D172D252A5E475F5C.

(Continued)

*Primary Examiner* — Larry E Waggle, Jr.
*Assistant Examiner* — Tyrone V Hall, Jr.
(74) *Attorney, Agent, or Firm* — Harness, Dickey & Pierce, P.L.C.

(57) ABSTRACT

A manufacturing fixture includes a rigid base defining a control plane. A first cone locator pin has a first longitudinal axis. The first cone locator pin is connected to the rigid base with the first longitudinal axis orthogonal to the control plane to engage a complementary locating aperture defined in a workpiece. The first cone locator pin engages the complementary locating aperture to locate the workpiece and constrain translation of the workpiece with respect to the control plane. A second cone locator pin has a second longitudinal axis. The second cone locator pin is connected to the rigid base with the second longitudinal axis orthogonal to the control plane to engage a complementary locating hole defined in a workpiece. The second cone locator pin engages the complementary locating hole to locate the workpiece and prevent rotation of the workpiece about the first longitudinal axis.

7 Claims, 6 Drawing Sheets

(51) Int. Cl.
*B23K 31/02* (2006.01)
*B25B 11/02* (2006.01)
*B23Q 1/62* (2006.01)
*B23K 101/18* (2006.01)

(52) U.S. Cl.
CPC .............. *B23Q 1/621* (2013.01); *B25B 11/02* (2013.01); *B23K 2201/18* (2013.01)

(58) Field of Classification Search
USPC .............................. 269/47, 50, 54.5, 54.4, 53
See application file for complete search history.

(56) References Cited

U.S. PATENT DOCUMENTS

| | | | | |
|---|---|---|---|---|
| 2,621,807 A | * | 12/1952 | Rendich | ............... B23Q 16/001 |
| | | | | 211/50 |
| 2,707,419 A | * | 5/1955 | Schron | .................... B23Q 1/58 |
| | | | | 269/152 |
| 3,188,715 A | * | 6/1965 | Michalsen | ............. B23Q 3/102 |
| | | | | 269/319 |
| 3,568,263 A | * | 3/1971 | Meehan | .................... H05K 7/12 |
| | | | | 174/158 R |
| 3,705,442 A | * | 12/1972 | Sygnator | ................ F16B 5/065 |
| | | | | 174/138 D |
| 3,777,052 A | * | 12/1973 | Fegen | .................. F16B 21/082 |
| | | | | 174/138 D |
| 4,058,885 A | * | 11/1977 | Bergman | ................ B23Q 1/38 |
| | | | | 269/20 |
| 4,375,716 A | | 3/1983 | Armstrong et al. | |
| 4,664,366 A | * | 5/1987 | Lane | .................... B23Q 16/001 |
| | | | | 269/303 |
| 4,741,090 A | * | 5/1988 | Monnier | ................ H01R 43/02 |
| | | | | 228/44.7 |
| 4,875,966 A | * | 10/1989 | Perko | ..................... B30B 15/06 |
| | | | | 156/580 |
| 4,946,126 A | * | 8/1990 | Williams | .............. F16B 39/284 |
| | | | | 248/476 |
| 5,046,707 A | * | 9/1991 | Allen | ..................... B23Q 16/02 |
| | | | | 269/309 |
| 5,138,772 A | * | 8/1992 | Barnes | ................... B23Q 16/00 |
| | | | | 269/317 |
| 5,249,343 A | * | 10/1993 | Grosso | ................... B23Q 16/04 |
| | | | | 269/21 |
| 5,630,269 A | | 5/1997 | Wasserbaech et al. | |
| 5,647,704 A | * | 7/1997 | Turchan | .................. B23Q 3/18 |
| | | | | 269/47 |
| 5,897,108 A | * | 4/1999 | Gordon | .............. H05K 13/0069 |
| | | | | 269/310 |
| 5,984,293 A | * | 11/1999 | Abrahamson | .......... B23Q 1/035 |
| | | | | 269/236 |
| 6,022,009 A | * | 2/2000 | Hill | ........................ B23Q 1/032 |
| | | | | 269/289 R |
| 6,089,557 A | | 7/2000 | Obrist | |
| 6,163,160 A | * | 12/2000 | Hanrahan | .......... G01R 31/2808 |
| | | | | 324/750.25 |
| 6,164,634 A | * | 12/2000 | Farlow | ............... H05K 13/0069 |
| | | | | 269/47 |
| 6,644,637 B1 | | 11/2003 | Shen et al. | |
| 6,644,641 B2 | * | 11/2003 | Phillips | ................ B23Q 16/001 |
| | | | | 269/310 |
| 6,712,348 B1 | | 3/2004 | Kramarczyk et al. | |
| 6,775,919 B2 | * | 8/2004 | Liebig | .................. B23Q 16/001 |
| | | | | 33/613 |
| 6,877,729 B2 | | 4/2005 | Lin et al. | |
| 7,000,966 B2 | | 2/2006 | Kramarczyk et al. | |
| 7,055,679 B2 | | 6/2006 | Shen et al. | |
| 7,210,212 B2 | | 5/2007 | Lin | |
| 7,484,464 B2 | | 2/2009 | Shen et al. | |
| 7,637,201 B2 | | 12/2009 | Lin | |
| 7,900,898 B2 | | 3/2011 | Wampler, II | |
| 7,971,916 B2 | | 7/2011 | Lin et al. | |
| 8,025,277 B2 | | 9/2011 | Lin et al. | |
| 8,033,002 B2 | | 10/2011 | Lin et al. | |
| 8,347,811 B2 | * | 1/2013 | Bucci | ..................... B05B 13/02 |
| | | | | 118/500 |
| 8,360,377 B2 | | 1/2013 | Geyer et al. | |
| 8,371,631 B2 | | 2/2013 | Lin | |
| 8,684,418 B2 | | 4/2014 | Lin et al. | |
| 8,770,902 B1 | * | 7/2014 | Miller | ................... F16B 5/0208 |
| | | | | 29/451 |
| 8,857,877 B2 | | 10/2014 | Lin et al. | |
| 9,521,397 B2 | | 12/2016 | McKay et al. | |
| 2009/0288458 A1 | | 11/2009 | Lin et al. | |
| 2010/0140969 A1 | | 6/2010 | Lin et al. | |
| 2011/0017007 A1 | | 1/2011 | Lin et al. | |
| 2011/0182655 A1 | | 7/2011 | Lin et al. | |
| 2013/0199018 A1 | * | 8/2013 | Maier | .................... B23Q 3/186 |
| | | | | 29/464 |

FOREIGN PATENT DOCUMENTS

| | | |
|---|---|---|
| CN | 101932406 A | 12/2010 |
| CN | 105479073 A | 4/2016 |
| DE | 102015116753 A1 | 4/2016 |

OTHER PUBLICATIONS

Floating Locating Pins, Carr Lane Manufacturing Co., 1 page, http://www.carrlane.com/catalog/index.cfm/
27225071F0B221118070C1C512A0A1F0900101B030010543C1
C0C16190D172D252A5E475F5E.
First Office Action for Chinese Application No. 201511022517.1 dated Oct. 18, 2016 with English translation; 15 pages.
Second Office Action for Chinese Application No. 201511022517.1 dated Jun. 9, 2017 with English translation; 17 pages.

* cited by examiner

MANUFACTURING FIXTURE

TECHNICAL FIELD

The present disclosure relates generally to manufacturing fixtures for releasably holding parts during manufacturing for modification of the parts.

BACKGROUND

In the manufacturing of some assemblies, a part may be joined to another part. In some of the assemblies, one of the parts to be joined may be held in a location by a fixture, and another part attached to the part that is held in the fixture. For example, a piece of sheet metal may be held in a fixture, and a weld-nut may be welded onto the piece of sheet metal. Reduction of variation in the relative locations of the parts to be joined may improve the value of the assemblies, reduce scrap, and improve the value of products that include the assembly.

SUMMARY

A manufacturing fixture includes a rigid base defining a control plane. A first cone locator pin has a first longitudinal axis. The first cone locator pin is connected to the rigid base with the first longitudinal axis orthogonal to the control plane to engage a complementary locating aperture defined in a workpiece. The first cone locator pin engages the complementary locating aperture to locate the workpiece and constrain translation of the workpiece with respect to the control plane. A second cone locator pin has a second longitudinal axis. The second cone locator pin is connected to the rigid base with the second longitudinal axis orthogonal to the control plane to engage a complementary locating hole defined in a workpiece. The second cone locator pin engages the complementary locating hole to locate the workpiece and prevent rotation of the workpiece about the first longitudinal axis.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figures 1A, 1B:
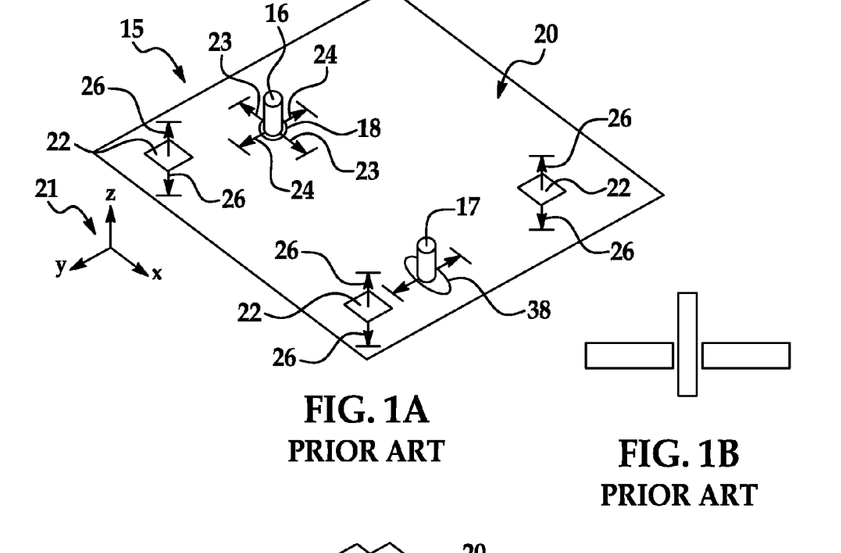
FIG. 1A is a semi-schematic perspective view depicting an existing manufacturing fixture.
FIG. 1B is a cross-section through a locating pin of the existing manufacturing fixture depicted in FIG. 1A.

Fixtures are used in the manufacturing of products from sheet metal to hold the sheet metal in a particular place for manufacturing operations such as welding. FIGS. 1A and 1B depict an existing fixture 15. A workpiece 20 is placed on the fixture 15 to be held in a particular location and orientation for welding a part (not shown) to the workpiece 20. The manufacturing system, for example, a robot arm, welds the part to the workpiece 20 in a location determined relative to the existing fixture 15. As such, any variation in the location of the workpiece 20 on the existing fixture 15 will cause variation in the location of the part welded to the workpiece 20. The existing fixture 15 locates the workpiece 20 via cylindrical locator pins 16, 17 and three locator pads 22 to constrain the workpiece.

For clarity in this disclosure, a Cartesian coordinate system 21 is defined relative to the fixture 15. For clarity, the Cartesian coordinate system 21 is oriented in directions conventional in the automotive arts. As depicted in FIG. 1A, the positive z-direction is up, the positive x-direction is to the right, and the y-direction is positive toward the rear. It is to be understood that the coordinate system 21 is not a limitation of the present disclosure, but rather provides concise and particular nomenclature to aid in correlating the figures with the description thereof.

The existing fixture 15 has a first cylindrical locator pin 16 and a second cylindrical locator pin 17 at spaced locations on the existing fixture 15. The workpiece 20 has a round hole 18 configured to accept the first cylindrical locator pin 16 therethrough. The round hole 18 is formed in the workpiece 20 with variation in the diameter of the round hole 18 and the location of the round hole 18. The interaction between the round hole 18 and the first cylindrical locator pin 16 constrains the workpiece in the x-direction and y-direction as indicated by the x-constraint arrows 23, and the y-constraint arrows 24.

The existing fixture 15 also includes three locator pads 22. The locator pads 22 establish a plane for the workpiece 20 to rest upon. The workpiece may be held against the locator pads 22 by the weight of the workpiece 20 or by a clamp (not shown). The locator pads 22 constrain the workpiece in the z-direction (as indicated by the z-constraint arrows 26), and constrain the workpiece against all rotation except rotation about the first cylindrical locator pin 16.

The second cylindrical locator pin 17 of the existing fixture 15 constrains the workpiece 20 against rotation about the first cylindrical locator pin 16. A slot 25 is provided in the workpiece 20 to receive the second cylindrical locator pin 17. The slot 25 accommodates variation in the location of the slot 25 relative to the round hole 18. The slot 25 may also include additional clearance to provide for dimensional variation caused by thermal expansion/contraction due to welding. As such, 6 degrees of freedom are nominally constrained by the existing fixture 15. If sufficient clearance is not provided in the round hole 18 and the slot 25, the workpiece 20 may not fit onto the existing fixture 15, or the workpiece 20 may get stuck and require special operations to free the workpiece 20 from the existing fixture 15. An example of a special operation would be for an operator to pry the workpiece 20 off of the existing fixture 15 using a prybar (not shown). The clearance provided to ensure that the manufacturing operations continue without interruption for special operations and without an unacceptable number of rejected workpieces (i.e., workpieces 20 that do not fit on the existing fixture 15) may generally increase the variation in the location of the workpiece 20 on the existing fixture 15.

The fixture 30 of the present disclosure locates the workpiece 20 with less variation while still preventing an unacceptable number of rejected workpieces and preventing interruptions in manufacturing operations for special operations to free workpieces 20 that would be stuck due to binding in the fixture 30. Further, the fixture 30 of the present disclosure allows the elimination of two of the three locator pads 22 that were in the existing fixture 15.

Figures 2A, 2B:
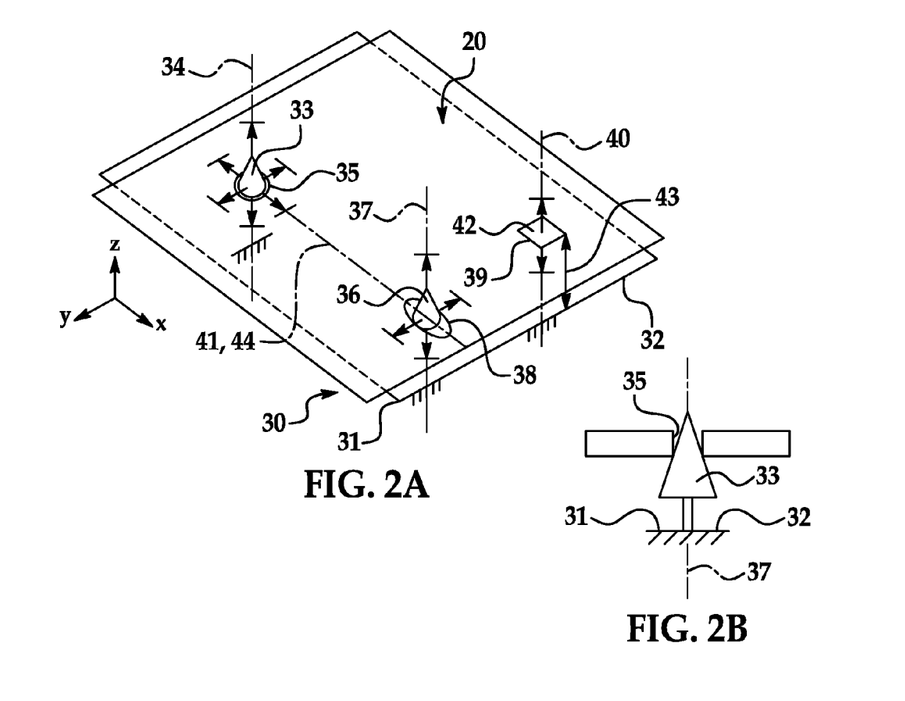
FIG. 2A is a semi-schematic perspective view depicting an example of a manufacturing fixture of the present disclosure.
FIG. 2B is a cross-section through a first cone locator pin depicted in FIG. 2A.

FIG. 2A is a semi-schematic perspective view that depicts a manufacturing fixture 30 of the present disclosure. The manufacturing fixture 30 includes a rigid base 31 defining a control plane 32. A first cone locator pin 33 has a first longitudinal axis 34 (see FIG. 2B). The first cone locator pin 33 is connected to the rigid base 31 with the first longitudinal axis 34 orthogonal to the control plane 32 to engage a complementary locating aperture 35 defined in a workpiece 20 to locate the workpiece 20 and constrain translation of the workpiece 20 with respect to the control plane 32. A second cone locator pin 36 has a second longitudinal axis 37. The second cone locator pin 36 is connected to the rigid base 31 with the second longitudinal axis 37 orthogonal to the control plane 32 to engage a complementary locating hole 38 defined in the workpiece 20 to locate the workpiece 20 and prevent rotation of the workpiece 20 about the first longitudinal axis 34. In an example, the complementary locating hole 38 may be a slot or a round hole. In FIG. 2A, the complementary locating hole 38 is depicted as a slot.

The example of the manufacturing fixture 30 depicted in FIG. 2A includes a third locator pin 39 having a third longitudinal axis 40. The third locator pin 39 is rigidly connected to the rigid base 31. The third longitudinal axis 40 is orthogonal to the control plane 32. The third longitudinal axis 40 is spaced from an intersecting line 41 on the control plane 32. The intersecting line 41 intersects the first longitudinal axis 34 and the second longitudinal axis 37. The third locator pin 39 has a contact surface 42 normal to the third longitudinal axis 40. The contact surface 42 is spaced a predetermined distance 43 from the control plane 32. The contact surface 42 is to abut the workpiece 20 and prevent the workpiece 20 from rotating about an intersecting axis 44 parallel to the intersecting line 41. As depicted in FIG. 2A, the intersecting axis 44 and the intersecting line 41 are the same. However, the intersecting line 41 may be spaced from the intersecting axis 44.

FIG. 2B depicts a cross-sectional side view of the first cone locator pin 33 from FIG. 2A. In the example depicted in FIG. 2B, the first cone locator pin 33 is rigidly connected to the rigid base 31 and translation of the workpiece 20 with respect to the control plane 32 is constrained in all directions by the interaction between the workpiece 20 and the first cone locator pin 33. In other words, the workpiece 20 cannot move in the x-direction, y-direction, or z-direction of the Cartesian coordinate system 21. There is no clearance between the workpiece 20 and the first cone locator pin 33 because the round hole 18 of the workpiece contacts the first cone locator pin 33 all around the circumference of the round hole 18.

Figure 3A:
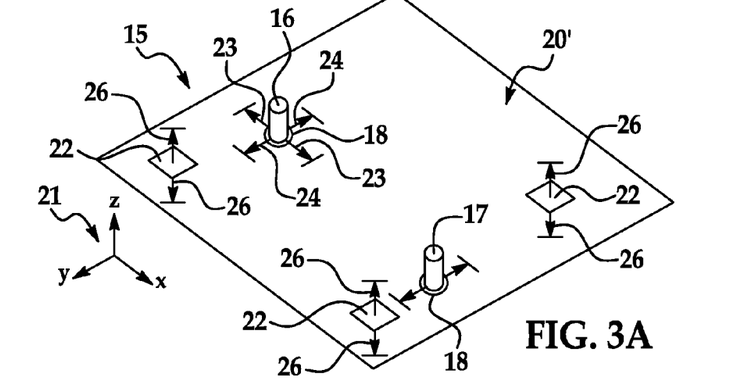
FIG. 3A is a semi schematic perspective view depicting the same existing fixture as shown in FIG. 1A with a workpiece that has two round holes to locate the workpiece.
Figure 3B:
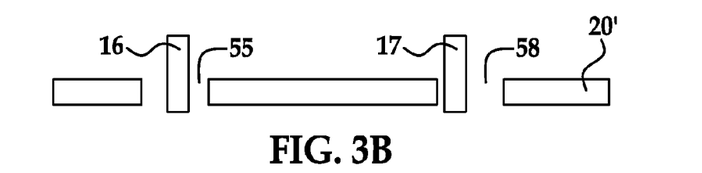
FIG. 3B is a cross-section through the locating pins of the existing manufacturing fixture depicted in FIG. 3A.

FIGS. 3A and 3B depict the same existing fixture 15 as shown in FIGS. 1A and 1B with a workpiece 20' that has two round holes 18 (compare to one round hole 18 and one slot 38 in workpiece 20) to locate the workpiece 20' on the first cylindrical locator pin 16 and the second cylindrical locator pin 17. Variation in the relative locations of the two round holes 18 is accounted for by increasing the nominal diameter of the two round holes 18. If a workpiece 20' was made with the two round holes 18 at exactly their nominal locations, the workpiece 20' would be movable because of the clearance between the cylindrical locator pins 16, 17 and the two round holes 18.

Figure 4A:
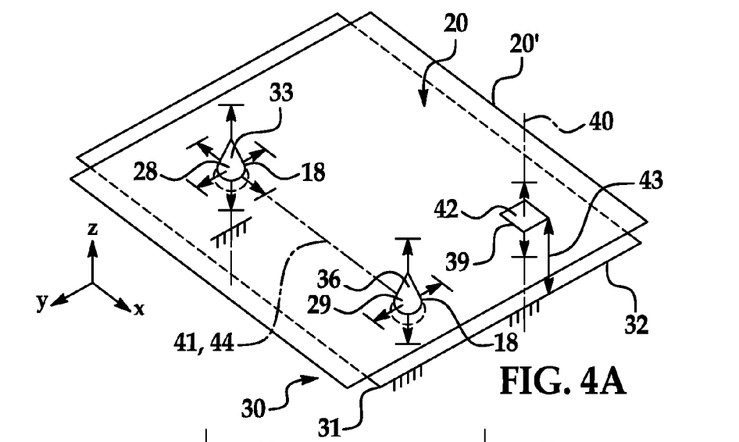
FIG. 4A is a semi schematic perspective view depicting the same example of the manufacturing fixture shown in FIG. 2A with a workpiece that has two round holes to locate the workpiece.
Figure 4B:
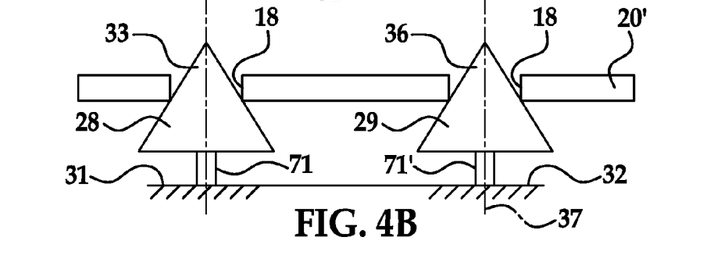
FIG. 4B is a cross-section through the cone locator pins of the example of the manufacturing fixture depicted in FIG. 4A.

As depicted in FIGS. 4A and 4B, the manufacturing fixture 30 may have a second cone locator pin 36 rigidly connected to the rigid base 31. In the example depicted in FIGS. 4A and 4B, the manufacturing fixture 30 has the first cone locator pin 33 and the second cone locator pin 36 both rigidly connected by a respective rigid connector 71, 71' to the rigid base 31. The first cone locator pin 33 may be a first right circular cone 28 as depicted in FIG. 4A and FIG. 4B. The second cone locator pin 36 may be a second right circular cone 29 as depicted in FIG. 4A and FIG. 4B. In the example depicted in FIGS. 4A and 4B, translation of the workpiece 20' with respect to the control plane 32 is constrained in all directions. It is to be understood that rotation of the workpiece 20' is not translation at the center of rotation.

The example of the manufacturing fixture 30 depicted in FIG. 4A includes a third locator pin 39 having a third longitudinal axis 40. The third locator pin 39 is rigidly connected to the rigid base 31. The third longitudinal axis 40 is orthogonal to the control plane 32. The third longitudinal axis 40 is spaced from an intersecting line 41 on the control plane 32. The intersecting line 41 intersects the first longitudinal axis 34 and the second longitudinal axis 37. The third locator pin 39 has a contact surface 42 normal to the third longitudinal axis 40. The contact surface 42 is spaced a predetermined distance 43 from the control plane 32. The contact surface 42 is to abut the workpiece 20 and prevent the workpiece 20 from rotating about an intersecting axis 44 parallel to the intersecting line 41. As depicted in FIG. 4A, the intersecting axis 44 and the intersecting line 41 are the same. However, the intersecting line 41 may be spaced from the intersecting axis 44.

Figure 5A:
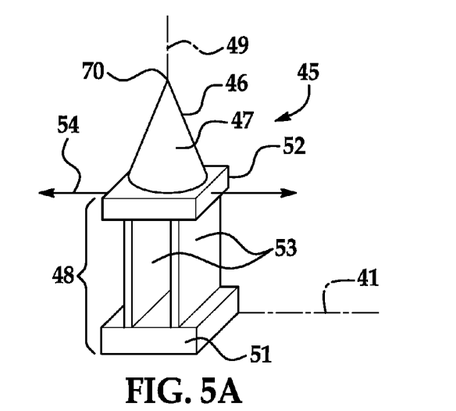
FIG. 5A is a semi-schematic perspective view depicting an example of a cone locator pin according to the present disclosure.
Figure 5B:
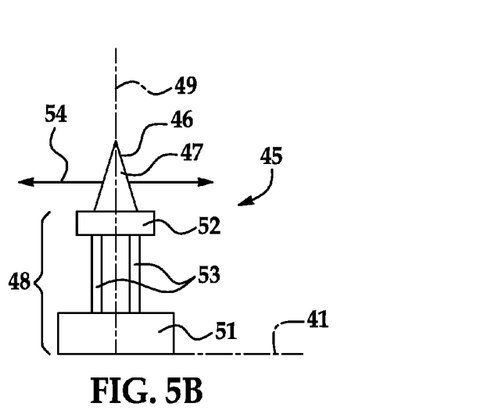
FIG. 5B is a semi-schematic side view depicting the example of the cone locator pin shown in FIG. 5A.
Figures 14A, 14B, 14C, 14D:
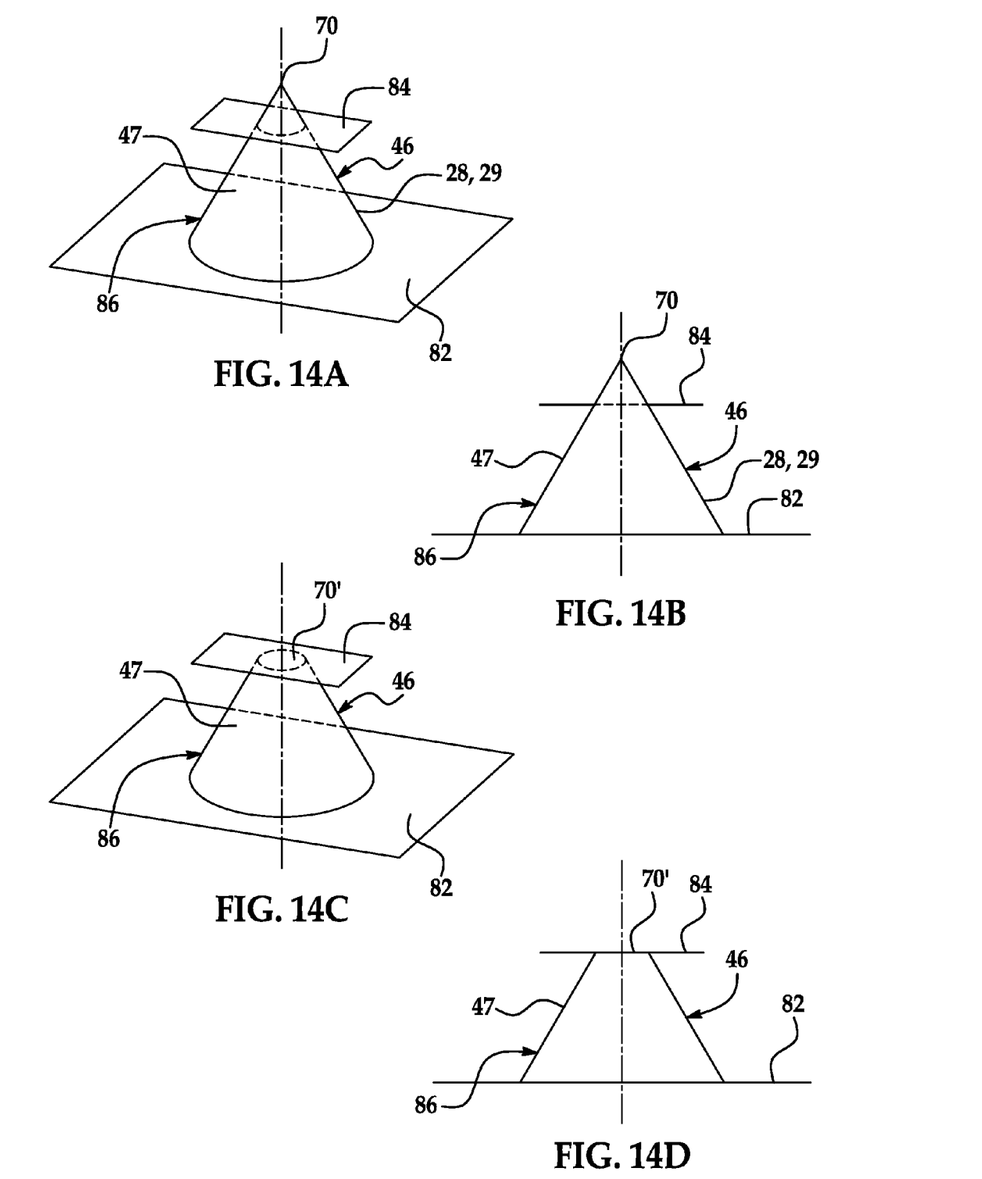
FIG. 14A is a perspective view depicting a right circular cone according to the present disclosure.
FIG. 14B is a side view of the right circular cone depicted in FIG. 14A.
FIG. 14C is a perspective view of a frustum of a right circular cone.
FIG. 14D is a side view of the frustum of the right circular cone depicted in FIG. 14C.

FIGS. 5A and 5B depict a cone locator pin 45 including a tip 46 having a frustoconical surface 47. It is to be understood that, in geometry and in the present disclosure, a cone includes a frustoconical surface. In examples of the present disclosure, the cone may be a right circular cone 28. In examples, the tip 46 may be a cone except the end 70 is not necessarily sharp. For example, as depicted in FIG. 14C and FIG. 14D, the end 70' may be rounded or flat. Eliminating the sharp end 70 may reduce a potential for the tip 46 to scratch the workpiece 20, 20' when the workpiece 20, 20' is being maneuvered into place on the fixture 30. The frustoconical surface 47 is coaxial with a pin longitudinal axis 49. A mounting frame 48 is to be rigidly mounted to the rigid base 31 and positioned between the rigid base 31 and the tip 46. The mounting frame 48 is to constrain motion of the tip 46 to translation in a tolerance plane defined by the pin longitudinal axis 49 and an intersecting line 41 on the control plane 32. The intersecting line 41 intersects the pin longitudinal axis 49 and lies in a plane parallel to the page as depicted in FIG. 5B. In the particular example shown in FIGS. 5A and 5B, the mounting frame 48 further constrains motion of the tip 46 to translation along the intersecting line 41.

As shown in FIGS. 5A and 5B, the mounting frame 48 includes a first platform 51 to rigidly mount to the rigid base 31. A second platform 52 is spaced from the first platform 51. A pair of parallel beam springs 53 is rigidly mounted to the first platform 51 and connected to the second platform 52. The pair of parallel beam springs 53 constrains the second platform 52 to move by translating relative to the first platform 51 in a translation direction 54 parallel to the intersecting line 41. The tip 46 is rigidly mounted to the second platform 52.

Figure 6A:
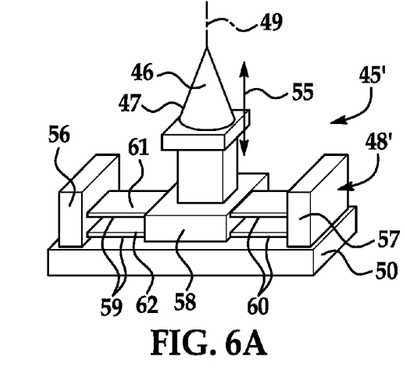
FIG. 6A is a semi-schematic perspective view depicting another example of a cone locator pin according to the present disclosure.
Figure 6B:
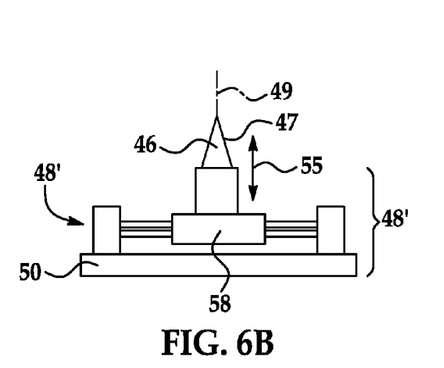
FIG. 6B is a semi-schematic side view depicting the example of the cone locator pin shown in FIG. 6A.

FIGS. 6A and 6B depict an example including a cone locator pin 45' that includes a tip 46 having a frustoconical surface 47. The tip 46 depicted in FIGS. 6A and 6B is similar to the tip 46 depicted in FIGS. 5A and 5B. The frustoconical surface 47 is coaxial with a pin longitudinal axis 49. The cone locator pin 45' also includes a mounting frame 48'. The mounting frame 48' is to be rigidly mounted to the rigid base 31 (e.g., see FIG. 9) and positioned between the rigid base 31 and the tip 46. In the example depicted in FIGS. 6A and 6B, the mounting frame 48' is to constrain motion of the tip 46 to translation parallel to the pin longitudinal axis 49, as indicated by the arrows at reference numeral 55.

As shown in FIGS. 6A and 6B, the mounting frame 48' includes a first wall 56 to rigidly mount to a base platform 50. A second wall 57 is spaced from the first wall 56 and may also be rigidly mounted to the base platform 50. A block 58 is centered between the first wall 56 and the second wall 57. A first pair of beam springs 59 is attached to the first wall 56 and to the block 58. One beam spring 61 in the first pair of beam springs 59 may be parallel to the other beam spring 62 in the first pair of beam springs 59.

A second pair of beam springs 60 is attached to the second wall 57 and to the block 58 opposite the first pair of beam springs 59. The first pair of beam springs 59 and the second pair of beam springs 60 support the block 58 and constrain the block 58 to move by translating relative to the first wall 56 in a direction parallel to the pin longitudinal axis 49. The tip 46 is rigidly mounted to the block 58. In the example depicted in FIGS. 6A and 6B, the tip 46 is indirectly mounted to the block 58 with a rigid spacer 63 positioned between the block 58 and the tip 46. In another example (not shown) the tip 46 may be directly mounted to the block 58.

Figure 7A:
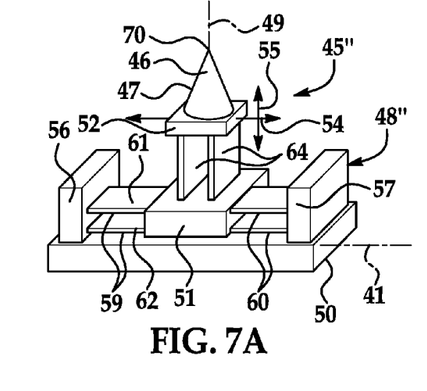
FIG. 7A is a semi-schematic perspective view depicting yet another example of a cone locator pin according to the present disclosure.
Figure 7B:
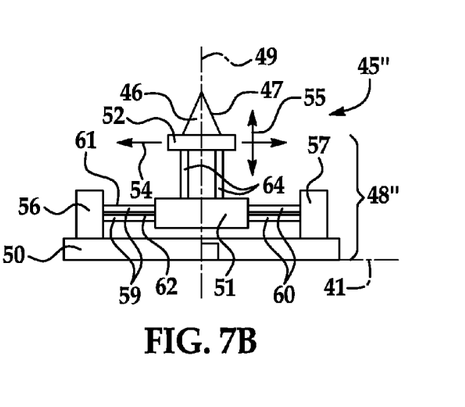
FIG. 7B is a semi-schematic side view depicting the example of the cone locator pin shown in FIG. 7A.

FIGS. 7A and 7B depict another example including a cone locator pin 45" that includes a tip 46 having a frustoconical surface 47. The tip 46 depicted in FIGS. 7A and 7B is similar to the tip 46 depicted in FIGS. 5A and 5B. The frustoconical surface 47 is coaxial with a pin longitudinal axis 49. A mounting frame 48" is to be rigidly mounted to the rigid base 31 and positioned between the rigid base 31 and the tip 46 (e.g., see FIG. 10). In the example depicted in FIGS. 7A and 7B, the mounting frame 48" is to constrain motion of the tip 46 to translation parallel to the pin longitudinal axis 49 as indicated by the arrows at reference numeral 55.

As shown in FIGS. 7A and 7B, the mounting frame 48" includes a first wall 56 to rigidly mount to a base platform 50. A second wall 57 is spaced from the first wall 56 and may also be rigidly mounted to the base platform 50. A first platform 51 is centered between the first wall 56 and the second wall 57. A first pair of beam springs 59 is attached to the first wall 56 and to the first platform 51. One beam spring 61 in the first pair of beam springs 59 may be parallel to the other beam spring 62 in the first pair of beam springs 59.

A second pair of beam springs 60 is attached to the second wall 57 and to the first platform 51 opposite the first pair of beam springs 59. The first pair of beam springs 59 and the second pair of beam springs 60 support the first platform 51 and constrain the first platform 51 to move by translating relative to the first wall 56 in a direction 55 parallel to the pin longitudinal axis 49.

In the example depicted in FIGS. 7A and 7B, a second platform 52 is spaced from the first platform 51. A third pair of parallel beam springs 64 is rigidly mounted to the first platform 51 and connected to the second platform 52. The third pair of parallel beam springs 64 constrains the second platform 52 to move by translating relative to the first platform 51 in a direction 54 parallel to the intersecting line 41. The intersecting line 41 intersects the pin longitudinal axis 49 and lies in a plane parallel to the page as depicted in FIG. 7B. The tip 46 is rigidly mounted to the second platform 52.

Figure 8:
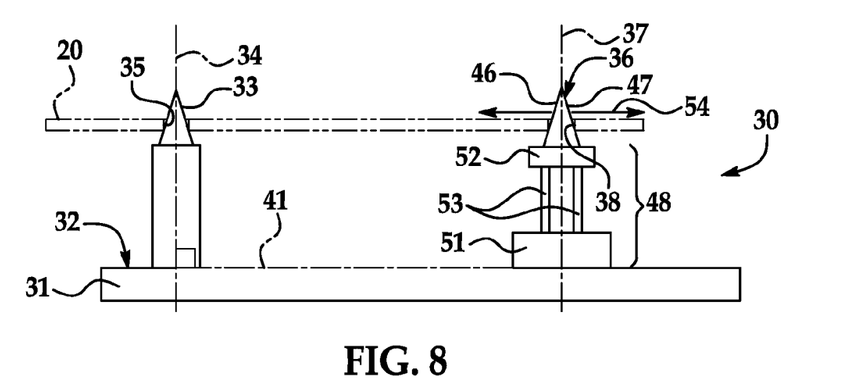
FIG. 8 is a semi-schematic side view depicting a manufacturing fixture of the present disclosure with a first cone locator pin rigidly mounted to a rigid base and a second cone locator pin with a mounting frame that is compliant in a horizontal direction.

FIG. 8 depicts a side view of an example of a manufacturing fixture 30 according to the present disclosure. As depicted in FIG. 8, the manufacturing fixture 30 includes a rigid base 31 to define a control plane 32. A first cone locator pin 33 has a first longitudinal axis 34. The first cone locator pin 33 is connected to the rigid base 31 with the first longitudinal axis 34 orthogonal to the control plane 32 to engage a complementary locating aperture 35 defined in a workpiece 20 to locate the workpiece 20 and constrain translation of the workpiece 20 with respect to the control plane 32. A second cone locator pin 36 has a second longitudinal axis 37. The second cone locator pin 36 is connected to the rigid base 31 with the second longitudinal axis 37 orthogonal to the control plane 32 to engage a complementary locating hole 38 defined in the workpiece 20 to locate the workpiece 20 and prevent rotation of the workpiece 20 about the first longitudinal axis 34.

In the example of the present disclosure depicted in FIG. 8, the second cone locator pin 36 includes a tip 46 having a frustoconical surface 47. The frustoconical surface 47 is coaxial with the second longitudinal axis 37. A mounting frame 48 is rigidly mounted to the rigid base 31 and positioned between the rigid base 31 and the tip 46. The mounting frame 48 is to constrain motion of the tip 46 to translation in a tolerance plane defined by the second longitudinal axis 37 and an intersecting line 41 on the control plane 32. The intersecting line 41 intersects the first longitudinal axis 34 and the second longitudinal axis 37.

As shown in FIG. 8, the mounting frame 48 includes a first platform 51 to rigidly mount to the rigid base 31. A second platform 52 is spaced from the first platform 51. A pair of parallel beam springs 53 is rigidly mounted to the first platform 51 and connected to the second platform 52. The pair of parallel beam springs 53 constrains the second platform 52 to move by translating relative to the first platform 51 in a translation direction 54 parallel to the intersecting line 41. The tip 46 is rigidly mounted to the second platform 52.

Figure 9:
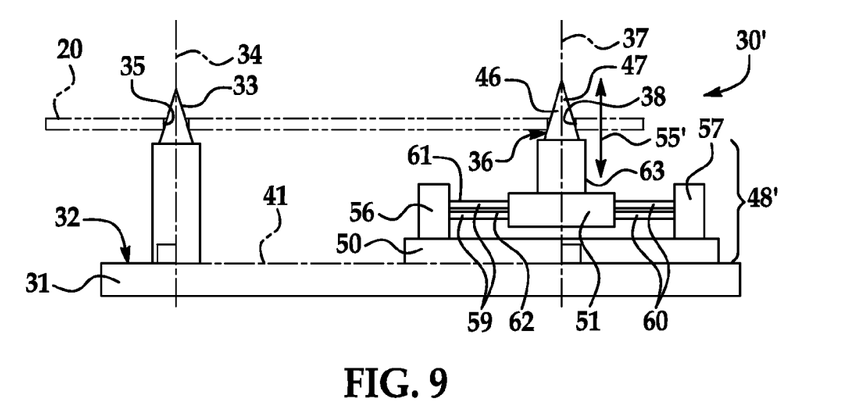
FIG. 9 is a semi-schematic side view depicting a manufacturing fixture of the present disclosure with a first cone locator pin rigidly mounted to a rigid base and a second cone locator pin with a mounting frame that is compliant in a vertical direction.

FIG. 9 depicts a side view of another example of a manufacturing fixture 30' according to the present disclosure. The example depicted in FIG. 9 is similar to the example depicted in FIG. 8 except the mounting frame 48' constrains motion of the tip 46 to translation parallel to the second longitudinal axis 37 as indicated by the arrows at reference numeral 55'. As depicted in FIG. 9, the manufacturing fixture 30' includes a rigid base 31 to define a control plane 32. A first cone locator pin 33 has a first longitudinal axis 34. The first cone locator pin 33 is connected to the rigid base 31 with the first longitudinal axis 34 orthogonal to the control plane 32 to engage a complementary locating aperture 35 defined in the workpiece 20 to locate the workpiece 20 and constrain translation of the workpiece 20 with respect to the control plane 32. A second cone locator pin 36 has a second longitudinal axis 37. The second cone locator pin 36 is connected to the rigid base 31 with the second longitudinal axis 37 orthogonal to the control plane 32 to engage a complementary locating hole 38 defined in the workpiece 20 to locate the workpiece 20 and prevent rotation of the workpiece 20 about the first longitudinal axis 34.

In the example of the present disclosure depicted in FIG. 9, the second cone locator pin 36 includes a tip 46 having a frustoconical surface 47. The frustoconical surface 47 is coaxial with the second longitudinal axis 37. A mounting frame 48' is rigidly mounted to the rigid base 31 and positioned between the rigid base 31 and the tip 46. The mounting frame 48' is to constrain motion of the tip 46 to translation parallel to the second longitudinal axis 37 as indicated by the arrows at reference numeral 55'. The intersecting line 41 intersects the first longitudinal axis 34 and the second longitudinal axis 37. As stated above, the intersecting line 41 lies on the control plane 32.

As shown in FIG. 9, the mounting frame 48' includes a first wall 56 to rigidly mount to a base platform 50. A second wall 57 is spaced from the first wall 56 and may also be rigidly mounted to the base platform 50. A block 58 is centered between the first wall 56 and the second wall 57. A first pair of beam springs 59 is attached to the first wall 56 and to the block 58. One beam spring 61 in the first pair of beam springs 59 may be parallel to the other beam spring 62 in the first pair of beam springs 59.

A second pair of beam springs 60 is attached to the second wall 57 and to the block 58 opposite the first pair of beam springs 59. The first pair of beam springs 59 and the second pair of beam springs 60 support the block 58 and constrain the block 58 to move by translating relative to the first wall 56 in a direction parallel to the second longitudinal axis 37. The tip 46 is rigidly mounted to the block 58. In the example depicted in FIG. 9, the tip 46 is indirectly mounted to the block 58 with a rigid spacer 63 positioned between the block 58 and the tip 46. In another example (not shown), the tip 46 may be directly mounted to the block 58.

Figure 10:
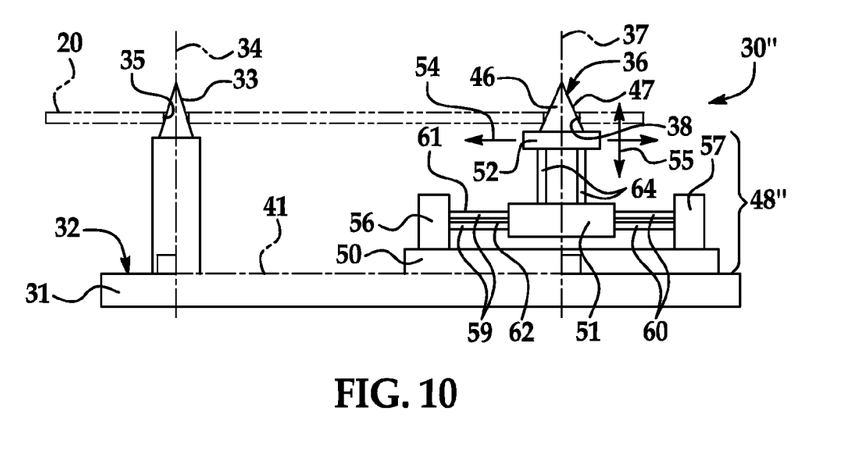
FIG. 10 is a semi-schematic side view depicting a manufacturing fixture of the present disclosure with a first cone locator pin rigidly mounted to a rigid base and a second cone locator pin with a mounting frame that is compliant in both the horizontal direction shown in FIG. 8 and the vertical direction shown in FIG. 9.

FIG. 10 depicts a side view of yet another example of a manufacturing fixture 30 according to the present disclosure. The example depicted in FIG. 10 is similar to the example depicted in FIGS. 8 and 9 except the mounting frame 48" constrains motion of the tip 46 to translation in a tolerance plane defined by the second longitudinal axis 37 and an intersecting line 41 on the control plane 32. The intersecting line 41 intersects the first longitudinal axis 34 and the second longitudinal axis 37. As depicted in FIG. 10, the manufacturing fixture 30" includes a rigid base 31 to define a control plane 32. A first cone locator pin 33 has a first longitudinal axis 34. The first cone locator pin 33 is connected to the rigid base 31 with the first longitudinal axis 34 orthogonal to the control plane 32 to engage a complementary locating aperture 35 defined in a workpiece 20 to locate the workpiece 20 and constrain translation of the workpiece 20 with respect to the control plane 32. A second cone locator pin 36 has a second longitudinal axis 37. The second cone locator pin 36 is connected to the rigid base 31 with the second longitudinal axis 37 orthogonal to the control plane 32 to engage a complementary locating hole 38 defined in the workpiece 20 to locate the workpiece 20 and prevent rotation of the workpiece 20 about the first longitudinal axis 34.

In the example of the present disclosure depicted in FIG. 10, the second cone locator pin 36 includes a tip 46 having a frustoconical surface 47. The frustoconical surface 47 is coaxial with the second longitudinal axis 37. A mounting frame 48" is rigidly mounted to the rigid base 31 and positioned between the rigid base 31 and the tip 46. The mounting frame 48" is to constrain motion of the tip 46 to translation in a tolerance plane defined by the second longitudinal axis 37 and an intersecting line 41 on the control plane 32. The intersecting line 41 intersects the first longitudinal axis 34 and the second longitudinal axis 37.

As shown in FIG. 10, the mounting frame 48" includes a first wall 56 to rigidly mount to a base platform 50. A second wall 57 is spaced from the first wall 56 and may also be rigidly mounted to the base platform 50. A first platform 51 is centered between the first wall 56 and the second wall 57. A first pair of beam springs 59 is attached to the first wall 56 and to the first platform 51. One beam spring 61 in the first pair of beam springs 59 may be parallel to the other beam spring 62 in the first pair of beam springs 59.

A second pair of beam springs 60 is attached to the second wall 57 and to first platform 51 opposite the first pair of beam springs 59. The first pair of beam springs 59 and the second pair of beam springs 60 support the first platform 51 and constrain the first platform 51 to move by translating relative to the first wall 56 in a direction parallel to the second longitudinal axis 37.

In the example depicted in FIG. 10, a second platform 52 is spaced from the first platform 51. A third pair of parallel beam springs 64 is rigidly mounted to the first platform 51 and connected to the second platform 52. The third pair of parallel beam springs 64 constrains the second platform 52 to move by translating relative to the first platform 51 in a direction parallel to the intersecting line 41. As stated above, the intersecting line 41 is in the control plane 32 and intersects the first longitudinal axis 34 and the second longitudinal axis 37. The tip 46 is rigidly mounted to the second platform 52.

Figure 11:
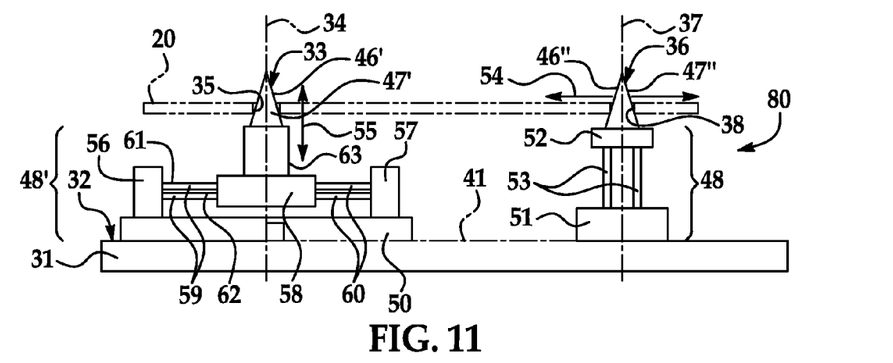
FIG. 11 is a semi-schematic side view depicting a manufacturing fixture of the present disclosure with a first cone locator pin having a mounting frame that is compliant in a vertical direction and a second cone locator pin with a mounting frame that is compliant in a horizontal direction.

In the example depicted in FIG. 11, the manufacturing fixture 30 depicted in FIG. 8 is modified by applying the mounting frame 48' depicted in FIGS. 6A and 6B to support the first cone locator pin 33. As depicted in FIG. 11, the manufacturing fixture 80 includes a rigid base 31 to define a control plane 32. A first cone locator pin 33 has a first longitudinal axis 34. The first cone locator pin 33 is connected to the rigid base 31 with the first longitudinal axis 34 orthogonal to the control plane 32 to engage a complementary locating aperture 35 defined in a workpiece 20 to locate the workpiece 20 and constrain translation of the workpiece 20 with respect to the control plane 32. A second cone locator pin 36 has a second longitudinal axis 37. The second cone locator pin 36 is connected to the rigid base 31 with the second longitudinal axis 37 orthogonal to the control plane 32 to engage a complementary locating hole 38 defined in the workpiece 20 to locate the workpiece 20 and prevent rotation of the workpiece 20 about the first longitudinal axis 34.

In the example of the present disclosure depicted in FIG. 11, the first cone locator pin 33 includes a first tip 46' having a first frustoconical surface 47' coaxial with the first longitudinal axis 34. A first mounting frame 48' is rigidly mounted to the rigid base 31 and positioned between the rigid base 31 and the first tip 46'. The first mounting frame 48' is to constrain motion of the first tip 46' to translation parallel to the first longitudinal axis 34.

In the example of the present disclosure depicted in FIG. 11, the first mounting frame 48' includes a first wall 56 to rigidly mount to the base platform 50. A second wall 57 is spaced from the first wall 56. A block 58 is centered between the first wall 56 and the second wall 57. A first pair of beam springs 59 is attached to the first wall 56 and to the block 58. One beam spring 61 in the first pair of beam springs 59 may be parallel to the other beam spring 62 in the first pair of beam springs 59.

A second pair of beam springs 60 is attached to the second wall 57 and to the block 58 opposite the first pair of beam springs 59. The first pair of beam springs 59 and the second pair of beam springs 60 support the block 58 and constrain the block 58 to move by translating relative to the first wall 56 in a direction parallel to the first longitudinal axis 34.

In the example of the present disclosure depicted in FIG. 11, the second cone locator pin 36 includes a second tip 46" having a second frustoconical surface 47" coaxial to the second longitudinal axis 37. A second mounting frame 48 is rigidly mounted to the rigid base 31 and is positioned between the rigid base 31 and the second tip 46". As shown in FIG. 11, the second mounting frame 48 includes a first platform 51 to rigidly mount to the rigid base 31. A second platform 52 is spaced from the first platform 51. A pair of parallel beam springs 53 is rigidly mounted to the first platform 51 and connected to the second platform 52. The pair of parallel beam springs 53 constrains the second platform 52 to move by translating relative to the first platform 51 in a translation direction 54 parallel to the intersecting line 41. As stated above, the intersecting line 41 is in the control plane 32 and intersects the first longitudinal axis 34 and the second longitudinal axis 37. The second tip 46" is rigidly mounted to the second platform 52.

Figure 12:
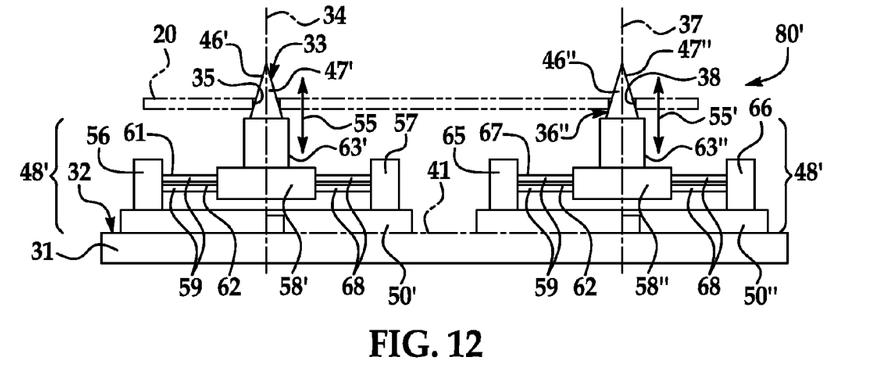
FIG. 12 is a semi-schematic side view depicting a manufacturing fixture of the present disclosure with a first cone locator pin having a mounting frame that is compliant in a vertical direction and a second cone locator pin with a mounting frame that is compliant in a vertical direction.

In the example depicted in FIG. 12, the manufacturing fixture 30' depicted in FIG. 9 is modified by applying the cone locator pin 45' depicted in FIGS. 6A and 6B to support the first cone locator pin 33. As depicted in FIG. 12, the manufacturing fixture 80' includes a rigid base 31 to define a control plane 32. A first cone locator pin 33 has a first longitudinal axis 34. The first cone locator pin 33 is connected to the rigid base 31 with the first longitudinal axis 34 orthogonal to the control plane 32 to engage a complementary locating aperture 35 defined in a workpiece 20 to locate the workpiece 20 and constrain translation of the workpiece 20 with respect to the control plane 32. A second cone locator pin 36 has a second longitudinal axis 37. The second cone locator pin 36 is connected to the rigid base 31 with the second longitudinal axis 37 orthogonal to the control plane 32 to engage a complementary locating hole 38 defined in the workpiece 20 to locate the workpiece 20 and prevent rotation of the workpiece 20 about the first longitudinal axis 34.

In the example of the present disclosure depicted in FIG. 12, the first cone locator pin 33 includes a first tip 46' having a first frustoconical surface 47' coaxial with the first longitudinal axis 34. A first mounting frame 48' is rigidly mounted to the rigid base 31 and positioned between the rigid base 31 and the first tip 46'. The first mounting frame 48' is to constrain motion of the first tip 46' to translation parallel to the first longitudinal axis 34.

In the example of the present disclosure depicted in FIG. 12, the first mounting frame 48' includes a first wall 56 to rigidly mount to the first base platform 50'. A second wall 57 is spaced from the first wall 56. A first block 58' is centered between the first wall 56 and the second wall 57. A first pair of beam springs 59 is attached to the first wall 56 and to the first block 58'. One beam spring 61 in the first pair of beam springs 59 may be parallel to the other beam spring 62 in the first pair of beam springs 59.

A second pair of beam springs 60 is attached to the second wall 57 and to the first block 58' opposite the first pair of beam springs 59. The first pair of beam springs 59 and the second pair of beam springs 60 support the first block 58' and constrain the first block 58' to move by translating relative to the first wall 56 in a direction parallel to the first longitudinal axis 34. The first tip 46' is rigidly mounted to the first block 58'. In the example depicted in FIG. 12, the first tip 46' is indirectly mounted to the first block 58' with a rigid spacer 63' positioned between the first block 58' and the first tip 46'. In another example (not shown) the first tip 46' may be directly mounted to the first block 58'.

In the example of the present disclosure depicted in FIG. 12, the second cone locator pin 36" includes a second tip 46" having a second frustoconical surface 47". A second mounting frame 48' is rigidly mounted to the rigid base 31 and positioned between the rigid base 31 and the second tip 46". The second mounting frame 48' is to constrain motion of the second tip 46" to translation in a direction parallel to the first longitudinal axis 34.

The second mounting frame 48' includes a third wall 65 to rigidly mount to the second base platform 50". A fourth wall 66 is spaced from the third wall 65. A block 58 is centered between the third wall 65 and the fourth wall 66. A third pair of parallel beam springs 67 is attached to the third wall 65 and to the second block 58". A fourth pair of parallel beam springs 68 is attached to the fourth wall 66 and to the second block 58" opposite the third pair of parallel beam springs 67. The third pair of parallel beam springs 67 and the fourth pair of parallel beam springs 68 support the second block 58" and constrain the second block 58" to move by translating relative to the third wall 65 in a direction parallel to the second longitudinal axis 37. The second tip 46" is rigidly mounted to the second block 58". In the example depicted in FIG. 12, the second tip 46" is indirectly mounted to the second block 58" with a rigid spacer 63" positioned between the second block 58" and the second tip 46". In another example (not shown), the second tip 46" may be directly mounted to the second block 58".

Figure 13:
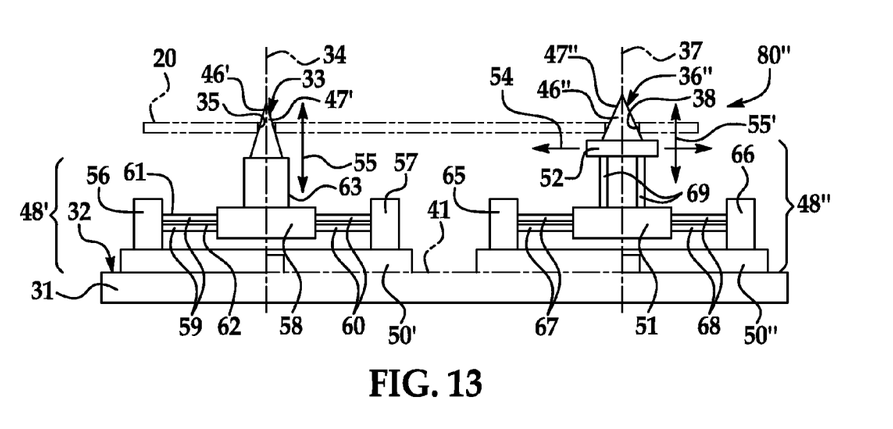
FIG. 13 is a semi-schematic side view depicting a manufacturing fixture of the present disclosure with a first cone locator pin having a mounting frame that is compliant in a vertical direction and a second cone locator pin with a mounting frame that is compliant in both the horizontal direction and the vertical direction.

In the example depicted in FIG. 13, the manufacturing fixture 30" depicted in FIG. 10 is modified by applying the cone locator pin 45' depicted in FIGS. 6A and 6B to support the first cone locator pin 33. As depicted in FIG. 13, the manufacturing fixture 80" includes a rigid base 31 to define a control plane 32. A first cone locator pin 33 has a first longitudinal axis 34. The first cone locator pin 33 is connected to the rigid base 31 with the first longitudinal axis 34 orthogonal to the control plane 32 to engage a complementary locating aperture 35 defined in a workpiece 20 to locate the workpiece 20 and constrain translation of the workpiece 20 with respect to the control plane 32. A second cone locator pin 36 has a second longitudinal axis 37. The second cone locator pin 36" is connected to the rigid base 31 with the second longitudinal axis 37 orthogonal to the control plane 32 to engage a complementary locating hole 38 defined in the workpiece 20 to locate the workpiece 20 and prevent rotation of the workpiece 20 about the first longitudinal axis 34.

In the example of the present disclosure depicted in FIG. 13, the first cone locator pin 33 includes a first tip 46' having a first frustoconical surface 47' coaxial with the first longitudinal axis 34. A first mounting frame 48' is rigidly mounted to the rigid base 31 and positioned between the rigid base 31 and the first tip 46'. The first mounting frame 48' is to constrain motion of the first tip 46' to translation parallel to the first longitudinal axis 34.

In the example of the present disclosure depicted in FIG. 13, the first mounting frame 48' includes a first wall 56 to rigidly mount to a first base platform 50'. A second wall 57 is spaced from the first wall 56. A block 58 is centered between the first wall 56 and the second wall 57. A first pair of beam springs 59 is attached to the first wall 56 and to the block 58. One beam spring 61 in the first pair of beam springs 59 may be parallel to the other beam spring 62 in the first pair of beam springs 59.

A second pair of beam springs 60 is attached to the second wall 57 and to the block 58 opposite the first pair of beam springs 59. The first pair of beam springs 59 and the second pair of beam springs 60 support the block 58 and constrain the block 58 to move by translating relative to the first wall 56 in a direction parallel to the first longitudinal axis 34.

In the example of the present disclosure depicted in FIG. 13, the second cone locator pin 36" includes a second tip 46" having a second frustoconical surface 47". A second mounting frame 48" is rigidly mounted to the rigid base 31 and positioned between the rigid base 31 and the second tip 46". The second mounting frame 48" is to constrain motion of the second tip 46" to translation in a tolerance plane defined by the second longitudinal axis 37 and an intersecting line 41 on the control plane 32.

The second mounting frame 48" includes a third wall 65 to rigidly mount to a second base platform 50". A fourth wall 66 is spaced from the third wall 65. A first platform 51 is centered between the third wall 65 and the fourth wall 66. A third pair of parallel beam springs 67 is attached to the third wall 65 and to the first platform 51. A fourth pair of parallel beam springs 68 is attached to the fourth wall 66 and to the first platform 51 opposite the third pair of parallel beam springs 67. The third pair of parallel beam springs 67 and the fourth pair of parallel beam springs 68 support the first platform 51 and constrain the first platform 51 to move by translating relative to the third wall 65 in a direction parallel to the second longitudinal axis 37. A second platform 52 is spaced from the first platform 51. The second tip 46" is rigidly mounted to the second platform 52. A fifth pair of parallel beam springs 69 is rigidly mounted to the first platform 51 and connected to the second platform 52. The fifth pair of parallel beam springs 69 constrains the second platform 52 to move by translating relative to the first platform 51 in a direction parallel to the intersecting line 41. The second tip 46" is rigidly mounted to the second platform 52.

FIG. 14A is a perspective view depicting a right circular cone according to the present disclosure. FIG. 14B is a side view of the right circular cone depicted in FIG. 14A. In examples of the present disclosure, the tip 46 may be a right circular cone 28, 29. A perfect right circular cone has a sharp end 70. It is to be understood that the tip 70, 70' is not necessarily sharp in examples of the present disclosure. In geometry, a frustum is a portion of a solid (in the present disclosure, a cone) that lies between two parallel planes cutting the solid. As depicted in FIGS. 14A-14D, the base plane 82 is parallel to the top plane 84. The surface of the frustum 86 between the base plane 82 and the top plane 84 is a frustoconical surface 47. FIG. 14C is a perspective view of a frustum 86 of a right circular cone. FIG. 14D is a side view of the frustum 86 of the right circular cone depicted in FIG. 14C.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A manufacturing fixture, comprising:
a rigid base defining a control plane;
a first cone locator pin having a first longitudinal axis, wherein:
the first cone locator pin is connected to the rigid base with the first longitudinal axis orthogonal to the control plane;
the first cone locator pin is to engage a complementary locating aperture defined in a workpiece to locate the workpiece and constrain translation of the workpiece with respect to the control plane; and
the first cone locator pin includes a first frustoconical surface coaxial with the first longitudinal axis to engage the complementary locating aperture; and
a second cone locator pin having a second longitudinal axis, wherein:
the second cone locator pin is connected to the rigid base with the second longitudinal axis orthogonal to the control plane;
the second cone locator pin is to engage a complementary locating hole defined in the workpiece to locate the workpiece and prevent rotation of the workpiece about the first longitudinal axis; and
the second cone locator pin includes:
a second frustoconical surface coaxial with the second longitudinal axis to engage the complementary locating hole;
a tip having the second frustoconical surface coaxial with the second longitudinal axis; and
a mounting frame rigidly mounted to the rigid base and positioned between the rigid base and the tip, wherein:
the mounting frame is to constrain motion of the tip to translation in a tolerance plane defined by the second longitudinal axis and an intersecting line on the control plane; and
the intersecting line intersects the first longitudinal axis and the second longitudinal axis;
wherein the mounting frame includes:
a first platform to rigidly mount to the rigid base;
a second platform spaced from the first platform; and
a pair of parallel beam springs rigidly mounted to the first platform and connected to the second platform wherein the pair of parallel beam springs constrains the second platform to move by translating relative to the first platform in a direction parallel to the intersecting line wherein the tip is rigidly mounted to the second platform.

2. A manufacturing fixture comprising:
a rigid base defining a control plane;
a first cone locator pin having a first longitudinal axis, wherein:
the first cone locator pin is connected to the rigid base with the first longitudinal axis orthogonal to the control plane;
the first cone locator pin is to engage a complementary locating aperture defined in a workpiece to locate the workpiece and constrain translation of the workpiece with respect to the control plane; and
the first cone locator pin includes a first frustoconical surface coaxial with the first longitudinal axis to engage the complementary locating aperture; and
a second cone locator pin having a second longitudinal axis, wherein:
the second cone locator pin is connected to the rigid base with the second longitudinal axis orthogonal to the control plane;
the second cone locator pin is to engage a complementary locating hole defined in the workpiece to locate the workpiece and prevent rotation of the workpiece about the first longitudinal axis; and
the second cone locator pin includes:
a second frustoconical surface coaxial with the second longitudinal axis to engage the complementary locating hole;
a tip having the second frustoconical surface coaxial with the second longitudinal axis; and
a mounting frame rigidly mounted to the rigid base and positioned between the rigid base and the tip, wherein:
the mounting frame is to constrain motion of the tip to translation in a tolerance plane defined by the second longitudinal axis and an intersecting line on the control plane;
the intersecting line intersects the first longitudinal axis and the second longitudinal axis; and
the mounting frame is to constrain motion of the tip to translation parallel to the second longitudinal axis;
wherein the mounting frame includes:
a first wall to rigidly mount to the rigid base;
a second wall spaced from the first wall;
a block centered between the first wall and the second wall;
a first pair of beam springs attached to the first wall and to the block; and
a second pair of beam springs attached to the second wall and to the block opposite the first pair of beam springs wherein the first pair of beam springs and the second pair of beam springs support the block and constrain the block to move by translating relative to the first wall in a direction parallel to the second longitudinal axis wherein the tip is rigidly mounted to the block.

3. A manufacturing fixture as defined in claim comprising:
a rigid base defining a control plane;
a first cone locator pin having a first longitudinal axis, wherein:
the first cone locator pin is connected to the rigid base with the first longitudinal axis orthogonal to the control plane;
the first cone locator pin is to engage a complementary locating aperture defined in a workpiece to locate the workpiece and constrain translation of the workpiece with respect to the control plane; and
the first cone locator pin includes a first frustoconical surface coaxial with the first longitudinal axis to engage the complementary locating aperture; and
a second cone locator pin having a second longitudinal axis, wherein:
the second cone locator pin is connected to the rigid base with the second longitudinal axis orthogonal to the control plane;
the second cone locator pin is to engage a complementary locating hole defined in the workpiece to locate the workpiece and prevent rotation of the workpiece about the first longitudinal axis; and
the second cone locator pin includes:
a second frustoconical surface coaxial with the second longitudinal axis to engage the complementary locating hole;

a tip having the second frustoconical surface coaxial with the second longitudinal axis; and
a mounting frame rigidly mounted to the rigid base and positioned between the rigid base and the tip, wherein:
the mounting frame is to constrain motion of the tip to translation in a tolerance plane defined by the second longitudinal axis and an intersecting line on the control plane; and
the intersecting line intersects the first longitudinal axis and the second longitudinal axis;
wherein the mounting frame includes:
a first wall to rigidly mount to a base platform;
a second wall spaced from the first wall;
a first platform centered between the first wall and the second wall;
a first pair of parallel beam springs attached to the first wall and to the first platform;
a second pair of parallel beam springs attached to the second wall and to the first platform opposite the first pair of parallel beam springs wherein the first pair of parallel beam springs and the second pair of parallel beam springs support the first platform and constrain the first platform to move by translating relative to the first wall in a direction parallel to the second longitudinal axis;
a second platform spaced from the first platform; and
a third pair of parallel beam springs rigidly mounted to the first platform and connected to the second platform wherein the third pair of parallel beam springs constrains the second platform to move by translating relative to the first platform in a direction parallel to the intersecting line, and wherein the tip is rigidly mounted to the second platform.

4. A manufacturing fixture, comprising:
a rigid base defining a control plane;
a first cone locator pin having a first longitudinal axis wherein the first cone locator pin is connected to the rigid base with the first longitudinal axis orthogonal to the control plane to engage a complementary locating aperture defined in a workpiece to locate the workpiece and constrain translation of the workpiece with respect to the control plane; and
a second cone locator pin having a second longitudinal axis wherein the second cone locator pin is connected to the rigid base with the second longitudinal axis orthogonal to the control plane to engage a complementary locating hole defined in the workpiece to locate the workpiece and prevent rotation of the workpiece about the first longitudinal axis, wherein:
the first cone locator pin includes:
a first tip having a first frustoconical surface coaxial with the first longitudinal axis; and
a first mounting frame rigidly mounted to the rigid base and positioned between the rigid base and the first tip wherein the first mounting frame is to constrain motion of the first tip to translation parallel to the first longitudinal axis; and
the first mounting frame includes:
a first wall to rigidly mount to a base platform;
a second wall spaced from the first wall;
a block centered between the first wall and the second wall;
a first pair of beam springs attached to the first wall and to the block; and
a second pair of beam springs attached to the second wall and to the block opposite the first pair of beam springs wherein the first pair of beam springs and the second pair of beam springs support the block and constrain the block to move by translating relative to the first wall in a direction parallel to the first longitudinal axis.

5. The manufacturing fixture as defined in claim 4 wherein the second cone locator pin includes:
a second tip having a second frustoconical surface coaxial to the second longitudinal axis; and
a second mounting frame rigidly mounted to the rigid base and positioned between the rigid base and the second tip, wherein the second mounting frame includes:
a first platform to rigidly mount to the rigid base;
a second platform spaced from the first platform; and
a pair of parallel beam springs rigidly mounted to the first platform and connected to the second platform;
wherein:
the pair of parallel beam springs constrains the second platform to move by translating relative to the first platform in a direction parallel to an intersecting line on the control plane;
the intersecting line intersects the first longitudinal axis and the second longitudinal axis; and
the second tip is rigidly mounted to the second platform.

6. A manufacturing fixture, comprising:
a rigid base defining a control plane;
a first cone locator pin having a first longitudinal axis wherein the first cone locator pin is connected to the rigid base with the first longitudinal axis orthogonal to the control plane to engage a complementary locating aperture defined in a workpiece to locate the workpiece and constrain translation of the workpiece with respect to the control plane; and
a second cone locator pin having a second longitudinal axis wherein the second cone locator pin is connected to the rigid base with the second longitudinal axis orthogonal to the control plane to engage a complementary locating hole defined in the workpiece to locate the workpiece and prevent rotation of the workpiece about the first longitudinal axis, wherein:
the first cone locator pin includes:
a first tip having a first frustoconical surface coaxial with the first longitudinal axis; and
a first mounting frame rigidly mounted to the rigid base and positioned between the rigid base and the first tip wherein the first mounting frame is to constrain motion of the first tip to translation parallel to the first longitudinal axis; and
the second cone locator pin includes:
a second tip having a second frustoconical surface coaxial with the second longitudinal axis; and
a second mounting frame rigidly mounted to the rigid base and positioned between the rigid base and the second tip, wherein:
the second mounting frame is to constrain motion of the second tip to translation in a tolerance plane defined by the second longitudinal axis and an intersecting line on the control plane; and
the intersecting line intersects the first longitudinal axis and the second longitudinal axis;
the first mounting frame includes:
a first wall to rigidly mount to a first base platform;
a second wall spaced from the first wall;
a block centered between the first wall and the second wall;

a first pair of beam springs attached to the first wall
and to the block; and a second pair of beam springs attached to the second
wall and to the block opposite the first pair of
beam springs wherein the first pair of beam
springs and the second pair of beam springs support the block and constrain the block to move by
translating relative to the first wall in a direction
parallel to the first longitudinal axis, and wherein
the first tip is rigidly mounted to the block; and the second mounting frame includes:
a third wall to rigidly mount to a second base
platform;
a fourth wall spaced from the third wall;
a first platform centered between the third wall and
the fourth wall;
a third pair of parallel beam springs attached to the
third wall and to the first platform;
a fourth pair of parallel beam springs attached to the
fourth wall and to the first platform opposite the
third pair of parallel beam springs wherein the
third pair of parallel beam springs and the fourth
pair of parallel beam springs support the first
platform and constrain the first platform to move
by translating relative to the third wall in a direction parallel to the second longitudinal axis;
a second platform spaced from the first platform; and
a fifth pair of parallel beam springs rigidly mounted
to the first platform and connected to the second
platform wherein the fifth pair of parallel beam
springs constrain the second platform to move by
translating relative to the first platform in a direction parallel to the intersecting line, and wherein
the second tip is rigidly mounted to the second
platform.

7. A manufacturing fixture comprising:
a rigid base defining a control plane;
a first cone locator pin having a first longitudinal axis,
wherein:
the first cone locator pin is connected to the rigid base
with the first longitudinal axis orthogonal to the
control plane;
the first cone locator pin is to engage a complementary
locating aperture defined in a workpiece to locate the
workpiece and constrain translation of the workpiece
with respect to the control plane; and
the first cone locator pin includes a first frustoconical
surface coaxial with the first longitudinal axis to
engage the complementary locating aperture; and
the first cone locator pin includes:
a first tip having the first frustoconical surface
coaxial with the first longitudinal axis; and
a first mounting frame rigidly mounted to the rigid
base and positioned between the rigid base and the
first tip wherein the first mounting frame is to
constrain motion of the first tip to translation
parallel to the first longitudinal axis;

a second cone locator pin having a second longitudinal
axis, wherein:
the second cone locator pin is connected to the rigid
base with the second longitudinal axis orthogonal to
the control plane;
the second cone locator pin is to engage a complementary locating hole defined in the workpiece to locate
the workpiece and prevent rotation of the workpiece
about the first longitudinal axis;
the second cone locator pin includes a second frustoconical surface coaxial with the second longitudinal
axis to engage the complementary locating hole; and
the second cone locator pin includes:
a second tip having the second frustoconical surface
coaxial with the second longitudinal axis; and
a second mounting frame rigidly mounted to the
rigid base and positioned between the rigid base
and the second tip, wherein:
the second mounting frame is to constrain motion of
the second tip to translation in a tolerance plane
defined by the second longitudinal axis and an
intersecting line on the control plane; and
the intersecting line intersects the first longitudinal
axis and the second longitudinal axis;
wherein:
the first mounting frame includes:
a first wall to rigidly mount to a first base platform;
a second wall spaced from the first wall;
a first block centered between the first wall and the
second wall;
a first pair of beam springs attached to the first wall and
to the first block;
a second pair of beam springs attached to the second
wall and to the first block opposite the first pair of
beam springs wherein the first pair of beam springs
and the second pair of beam springs support the first
block and constrain the first block to move by
translating relative to the first wall in a direction
parallel to the first longitudinal axis, and wherein the
first tip is rigidly mounted to the first block; and
the second mounting frame includes:
a third wall to rigidly mount to a second base platform;
a fourth wall spaced from the third wall;
a second block centered between the third wall and the
fourth wall;
a third pair of parallel beam springs attached to the third
wall and to the second block; and
a fourth pair of parallel beam springs attached to the
fourth wall and to the second block opposite the third
pair of parallel beam springs wherein the third pair of
parallel beam springs and the fourth pair of parallel
beam springs support the second block and constrain
the second block to move by translating relative to
the third wall in a direction parallel to the second
longitudinal axis, and wherein the second tip is
rigidly mounted to the second block.

* * * * *